(12) United States Patent
Lozac'h et al.

(10) Patent No.: US 10,308,311 B2
(45) Date of Patent: Jun. 4, 2019

(54) TELESCOPIC SUSPENSION DEVICE FITTED WITH A PRETENSION TRACKING SYSTEM

(71) Applicant: DECATHLON, Villeneuve d'Ascq (FR)

(72) Inventors: Rémi Lozac'h, Saint Andre Lez Lille (FR); Sylvain Giovannetti, Arras (FR); Antoine Biloe, Amiens (FR)

(73) Assignee: DECATHLON, Villeneuve d'Ascq (FR)

( * ) Notice: Subject to any disclaimer, the term of this patent is extended or adjusted under 35 U.S.C. 154(b) by 235 days.

(21) Appl. No.: 14/909,993

(22) PCT Filed: Jul. 29, 2014

(86) PCT No.: PCT/FR2014/051966
§ 371 (c)(1),
(2) Date: Feb. 4, 2016

(87) PCT Pub. No.: WO2015/019001
PCT Pub. Date: Feb. 12, 2015

(65) Prior Publication Data
US 2016/0167730 A1    Jun. 16, 2016

(30) Foreign Application Priority Data
Aug. 6, 2013  (FR) ...................................... 13 57830

(51) Int. Cl.
*B62K 25/08* (2006.01)
*F16F 9/32* (2006.01)
(Continued)

(52) U.S. Cl.
CPC .............. *B62K 25/08* (2013.01); *F16F 1/121* (2013.01); *F16F 9/3264* (2013.01); *B62K 2025/048* (2013.01); *B62K 2201/04* (2013.01)

(58) Field of Classification Search
CPC .............. B62K 25/08; B62K 2025/048; B62K 2201/04; F16F 1/121; F16F 9/3264; F16F 9/00
See application file for complete search history.

(56) References Cited

U.S. PATENT DOCUMENTS

| 6,217,049 B1 * | 4/2001 | Becker | .................. | B62K 25/08 |
| | | | | 188/285 |
| 6,708,999 B1 | 3/2004 | Baltes | | |
| (Continued) | | | | |

FOREIGN PATENT DOCUMENTS

| CN | 2608406 Y | 3/2004 |
| CN | 1714021 A | 12/2005 |
| (Continued) | | |

OTHER PUBLICATIONS

Written Opinion for corresponding International Application No. PCT/FR2014/051966, dated Feb. 9, 2016 (6 pages).
(Continued)

*Primary Examiner* — Xuan Lan Nguyen
(74) *Attorney, Agent, or Firm* — Bookoff McAndrews, PLLC

(57) ABSTRACT

Telescopic suspension device (10) attached to the hub (422) of a wheel (424) of the type comprising a first tube (12), a second tube (14) sliding relative to the first tube and a main spring (34) arranged inside said tubes, and further comprising a pretension adjustment stopper (18) of the spring (34) installed at the upper end (16) of said first tube. The suspension device comprises a pretension tracking system (39) of the spring, representative of the weight of the user, connected to the stopper (18).

9 Claims, 14 Drawing Sheets

(51) Int. Cl.
*F16F 1/12* (2006.01)
*B62K 25/04* (2006.01)

(56) References Cited

U.S. PATENT DOCUMENTS

| | | | |
|---|---|---|---|
| 6,827,184 B1* | 12/2004 | Lin | B60G 11/15 |
| | | | 188/321.11 |
| 2004/0201145 A1 | 10/2004 | Chen | |
| 2005/0252330 A1 | 11/2005 | Denk | |
| 2008/0099968 A1* | 5/2008 | Schroeder | B62K 25/08 |
| | | | 267/166 |
| 2009/0033011 A1* | 2/2009 | Chen | B62K 25/04 |
| | | | 267/286 |
| 2009/0255768 A1* | 10/2009 | Inoue | B62K 25/08 |
| | | | 188/313 |
| 2010/0252792 A1 | 10/2010 | Bennett | |
| 2010/0252972 A1 | 10/2010 | Cox et al. | |
| 2011/0187076 A1* | 8/2011 | Gonzalez | B62K 25/04 |
| | | | 280/276 |

FOREIGN PATENT DOCUMENTS

| | | |
|---|---|---|
| DE | 102007056313 | 5/2009 |
| EP | 1567408 B1 | 7/2006 |
| EP | 2277769 B1 | 6/2011 |
| TW | 354061 | 3/1999 |
| TW | M283793 | 12/2005 |

OTHER PUBLICATIONS

Taiwan Search Report for corresponding Taiwanese Patent Application No. 103126808, dated Aug. 5, 2016 (6 pages including English translation of Office Action and Search Report).

* cited by examiner

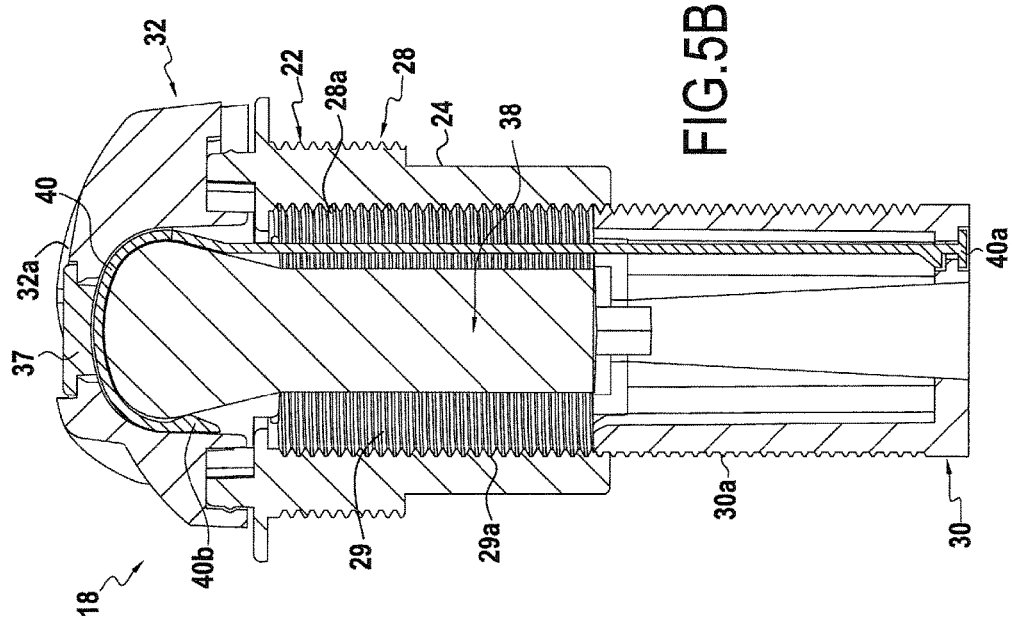
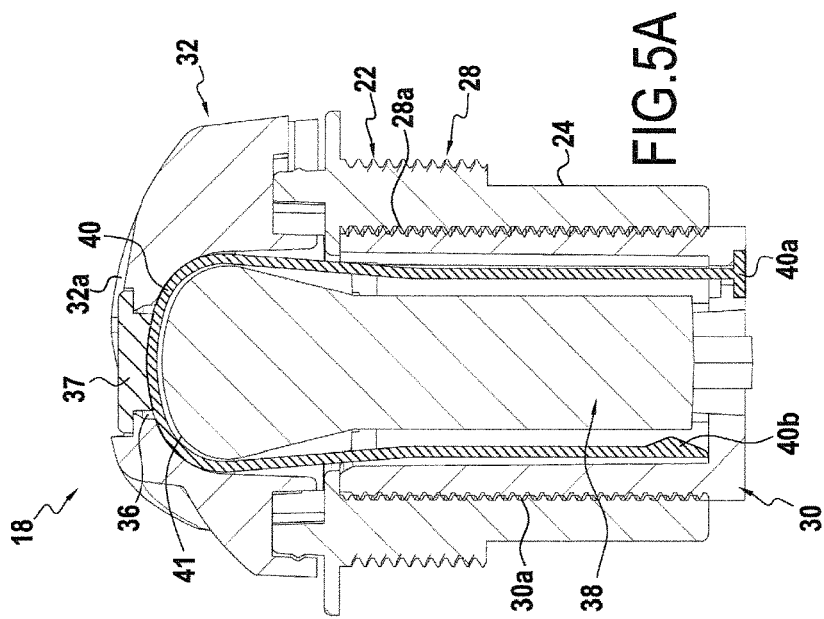

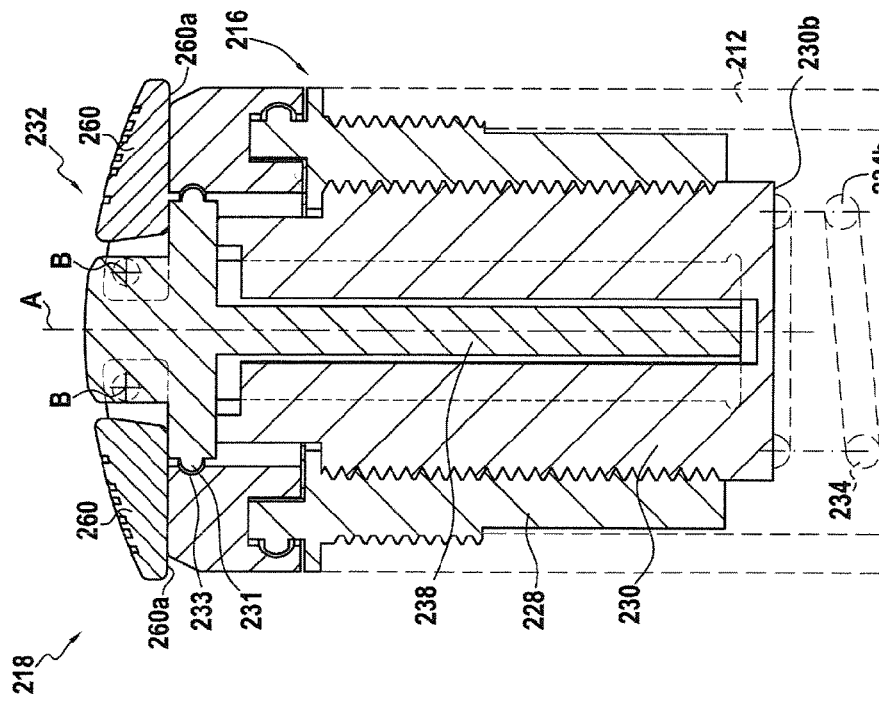
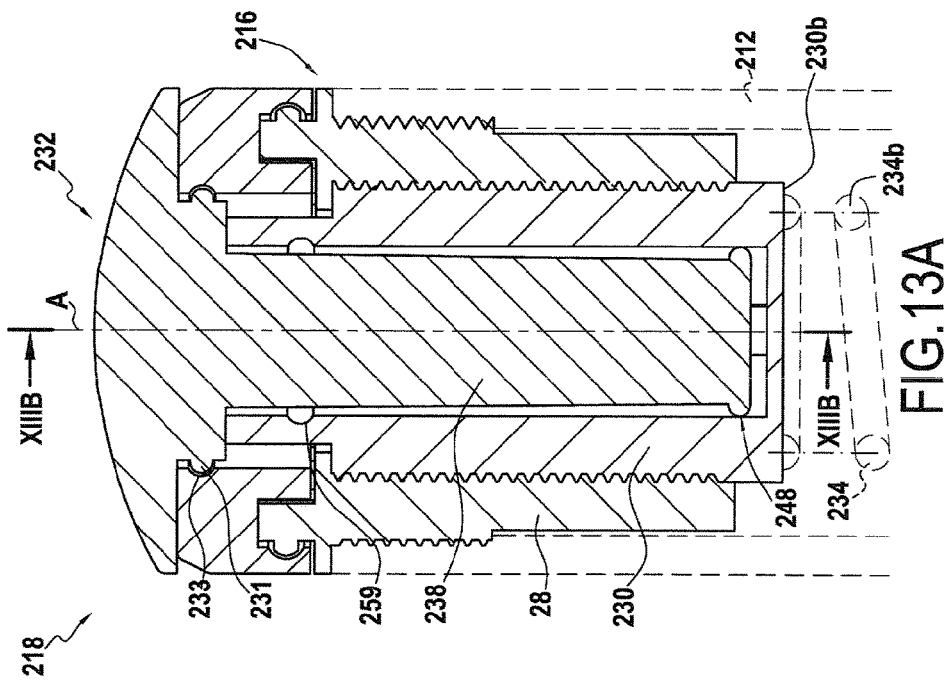

TELESCOPIC SUSPENSION DEVICE FITTED WITH A PRETENSION TRACKING SYSTEM

BACKGROUND OF THE INVENTION

The present invention relates to the field of suspension of vehicles and more particularly vehicle telescopic suspension devices and especially two-wheeled vehicles such as bicycles.

Suspension devices installed on bicycles improve absorption of shocks which are linked to deformation of terrain on which the vehicle is used.

Classic suspension devices configured to be attached to the hub of a wheel comprising a first tube, a second tube sliding relative to the first tube and a main spring arranged inside said tubes, and also comprising a pretension adjustment stopper of the main spring installed at the upper end of said first tube.

This type of suspension device especially is described more particularly in the document EP 1 567 408 which has the features indicated previously and also has an indication of range of lateral freedom of the first tube sliding in the second tube, this indication being provided by a graduation marked on the outer surface of the first tube.

However a disadvantage of this type of device is the difficulty for the user in handling the suspension device to achieve the appropriate damping.

OBJECT AND SUMMARY OF THE INVENTION

An aim of the invention is to propose a telescopic suspension device rectifying the above disadvantages.

To achieve this, the pretension adjustment stopper of the main spring comprises a pretension tracking system of the main spring, representative of the weight of the user.

It is understood that the pretension adjustment stopper has effect to compress the main spring which is arranged in a cavity formee by the first tube and the second tube. As a consequence, the actuation of the pretension adjustment stopper can adjust the pretension in compress of main spring.

The effect of rotation of the pretension stopper in a first direction, about the longitudinal axis of the first tube, is to increase the tension on the main spring as soon as the distance between the two ends of the spring is decreased relative to the existing distance prior to rotation in the first direction.

Also, when the pretension stopper is actuated in a second direction, opposite the first direction, the tension exerted on the spring is diminished because the distance between the two ends of the spring is increase relative to the existing distance prior to rotation in the second direction.

Adjusting the pretension exerted on the main spring is therefore done by turning the pretension stopper in the first direction or in the second direction. The user therefore presses on the pretension stopper to regulate the pretension of the main spring.

Because of the invention, as the pretension stopper comprises the tracking system, the user visualises immediately, on the pretension adjustment stopper, the level of pretension when handling the pretension stopper, as a result of which the pretension tracking system lets him fine-tune the pretension level.

Accordingly, simple and rapid adjustment of the device can be made as a function of the weight of the user. The telescopic suspension device is adjusted so that the tension exerted on the main spring is in correspondence with the weight of the user. This achieves damping in ratio to the weight of the user.

Preferably, said adjustment stopper comprises a body fixed to the end of the first tube; said body houses a plunger threaded externally and screwed into an inner tapped portion of the body, said plunger is supported against one of the ends of the main spring, an actuation button is mounted in rotation at an end of the body by being coupled in rotation to said plunger by a sliding arrangement having longitudinal groove and rib.

When the actuation button is actuated in the first direction about the longitudinal axis, the plunger is also set in rotation. As the body is fixed relative to the first tube, the plunger moves according to the longitudinal axis towards the end of the first tube opposite that bearing the stopper. Also, the plunger is in contact with one of the ends of the spring such that displacement of the plunger causes an increase in pretension of the main spring, which causes adjustment adapted to the weight of the user.

When the actuation button is actuated in the second direction about the longitudinal axis, the plunger is also set in rotation in the second direction such that the plunger decreases the compression undergone by the main spring. The pretension decreases. To achieve this, the plunger rises back towards the body of the pretension stopper. In this way, compression of the spring is diminished to where there is adjustment in pretension adapted to the weight of the user, this adjustment being made considerably easier by the presence of the tracking system.

Also, the actuation button, mounted in rotation on the body, comprises a groove and rib arrangement which cooperates with the plunger such that when the actuation button is set in rotation in the first direction or the second direction according to the longitudinal axis, the plunger is driven respectively in the first direction or the second direction.

Said plunger preferably comprises an axial recess in which an extension of the actuation button engages, and said sliding arrangement is defined between said extension and the inner surface of said axial recess.

The axial recess of the plunger receives the extension of the actuation button. The inner surface of the axial recess of the plunger comprises ribs and grooves which cooperate with the extension of the actuation button. In this way, when the actuation button is set in rotation in the first direction the extension is set in rotation, and the plunger is also set in rotation in the first direction by the plunger and the extension of the actuation button comprising complementary ribs and grooves. This achieves direct driving of the plunger by action on the actuation button, resulting in simple and rapid adjustment of the suspension device.

Advantageously, the actuation button comprises an external prehension part fitted with a window, said actuation button is fixed to said extension, a passage is defined between the plunger and the extension, on the one hand, and between the extension and the button, on the other hand, this passage passing opposite the window, the pretension tracking system comprises a flexible band, housed in the passage, bearing graduations representative of the weight of a user, and the flexible band is fixed to a point of the plunger. The flexible band can be attached to the plunger by means such as adhesive means or means such as locating lugs or an equivalent means.

When the actuation button is set in rotation according to the first direction, one of the ends of the flexible band fixed to a point of the plunger undergoes longitudinal displacement according to the longitudinal axis towards the interior of the first tube. Displacement of the flexible band is connected directly to displacement of the plunger. Displacement of the flexible band occurs inside the passage defined between the plunger and the extension on the one hand and between the extension and the button on the other hand.

As a consequence, the flexible band arranged in the passage made opposite the window shifts and scrolls the graduations made on the upper part of the band. When the graduation which corresponds to the weight of the user is displayed in the window, the result is adjustment of the telescopic suspension device as a function of the weight of the user. In this way, the pretension exerted on the main spring of the telescopic suspension device is as a function of the weight of the user.

Advantageously, according to another embodiment the pretension tracking system of the main spring is supported by the extension, the actuation button is mobile longitudinally relative to the plunger between two spaced longitudinally stops, and the tracking system is supported by the actuation button itself. The pretension tracking system advantageously comprises graduation scales indicating different user weights. Each graduation can represent an echelon of 5 kilograms or even any other graduation representative of the weight of a user.

The extension of the actuation button comprises in its lower part cooperation elements with the stops present in the upper part of the plunger. The actuation button is in an actuation position when the cooperation elements cooperate with the stops arranged on the plunger, such that the graduations borne on the extension of the actuation button can be read by the user.

When the actuation button is actuated in the first direction, it directly drives the plunger in rotation in the first direction. As a consequence, the plunger moves longitudinally according to the longitudinal axis so as to compress the main spring and increase the pretension of the main spring. Also, in the same movement as the plunger the actuation button penetrates the body. To regulate pretension, the actuation button is turned until the graduation corresponding to the weight of the user is aligned with the upper surface of the pretension stopper, resulting in simple and rapid adjustment of the suspension device as a function of the weight of the user.

According to another embodiment, the actuation button comprises articulated fins.

When the fins, mounted in rotation relative to the upper part of the actuation button, are positioned in planes substantially parallel and perpendicular to the upper surface of the pretension stopper, said fins offer a prehension surface for easily gripping and actuating the actuation button.

Also, the articulated fins can be retracted by being positioned so as to join the upper surface of the stopper to avoid any accidental adjustment of the pretension.

According to another embodiment, the pretension tracking system of the main spring is supported by a rod inserted into a housing formed in the extension; a ratchet mechanism connected to the rod is arranged at a lower end of the extension.

The housing comprises an orifice made on the upper surface of the actuation button such that the rod is extracted by the upper part of the actuation button.

The rod has a deployed position in which it projects from the pretension stopper, and a retracted position in which it is housed in the pretension stopper.

When the rod is in the unlocked position, a part of the rod is extracted of the orifice realised in the actuation button. In this way, a part of the rod is arranged above the upper surface of the actuation button. Said rod is held in the unlocked position by means of a second spring. The second spring has a first end supported against the lower face of the housing of the plunger. The second spring also comprises a second end which cooperates with the rod so as to keep said rod in tension.

Also, the tracking system comprises a graduation for tracking the weight corresponding to the preferred pretension. As a consequence, when the actuation button is actuated in the first direction about the longitudinal axis and when the rod is kept in the unlocked position, the plunger moves towards the end opposite that bearing the stopper and compresses the main spring. Also, by way of the second spring supported against the inner surface of the plunger, the rod follows the displacement of the plunger.

It is clear that the graduations arranged on the rod accompany displacement of the plunger. In this way, adjustment of the suspension device happens when the graduation corresponding to the weight of the user is aligned with the upper edge of the window made in the actuation button.

Also, the rod is kept in the locked position by means of blockage elements arranged at the lower end of said rod which cooperate with the lower surface of the extension of the actuation button. Because of this aspect, the adjustment rod is arranged in the housing, which avoids deterioration due to the external environment.

According to yet another variant embodiment, the button has the form of a key which engages in an orifice made in the upper part of the pretension stopper, the key cooperating with the plunger.

The pretension stopper comprises a window in which the key is introduced such that the key cooperates with the plunger, and said key follows the displacement of the plunger. In this way, the key comprising the graduations representing the weight of the user arranged on the part introduced to the orifice, follows the displacement of the plunger when the actuation button is actuated to align the graduation corresponding to the weight of the user with the upper window edge.

Also, the adjustment key is removable so that said key does not undergo any aggression from the external environment.

Also, the invention relates to a bike frame comprising at least one telescopic suspension device according to the invention.

BRIEF DESCRIPTION OF THE DRAWINGS

The invention will be more clearly understood from the following description of embodiments of the invention given by way of non-limiting example in reference to the attached drawings, in which:

FIGS. 5A and 5B are sectional views of the first embodiment of the pretension adjustment stopper;

FIGS. 13A and 13B are sectional views of the third embodiment of the pretension adjustment stopper mounted on the suspension device where the plunger is in a first position;

DETAILED DESCRIPTION OF THE INVENTION

Figure 1:
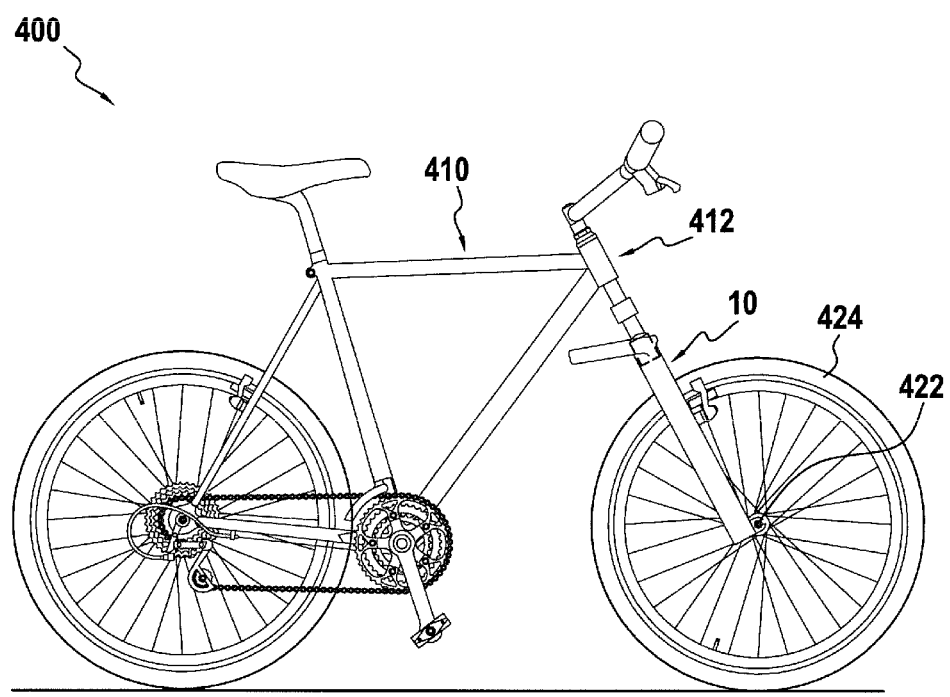
FIG. 1 is a view of a bike on which is installed a suspension device according to the invention.
Figure 2:
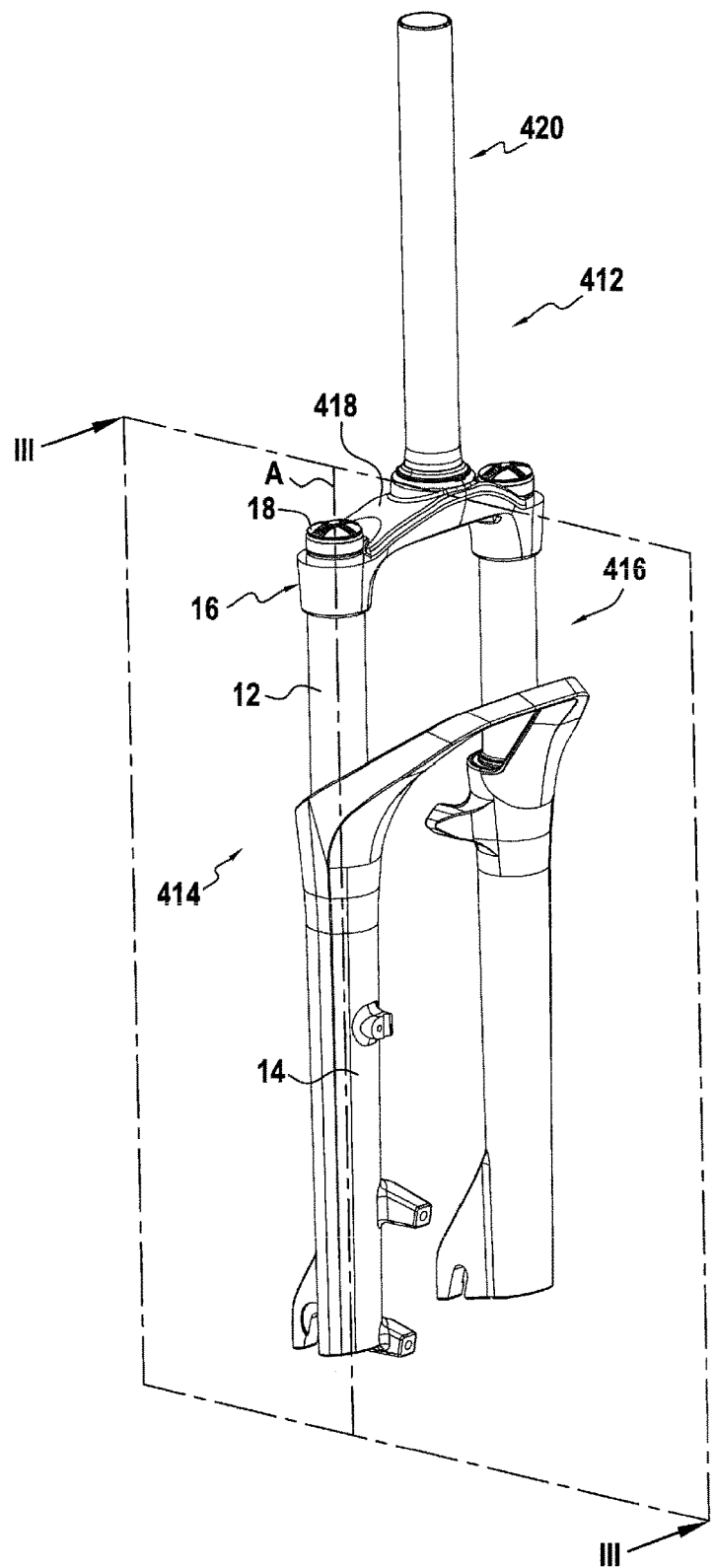
FIG. 2 is a view in perspective of a fork comprising a suspension device according to the invention.

FIGS. 1 and 2 illustrate a suspension device 10 according to the present invention mounted on a bike 400 fitted with a frame 410 comprising a directional fork 412 comprising two arms 414 and 416 attached to each other by means of a connector 418 connected solidly to a direction tube 120. The suspension device is connected to the hub 422 of a wheel 424.

According to another example, the fork 412 could comprise a single arm connected to the direction tube of the fork.

Figure 3:
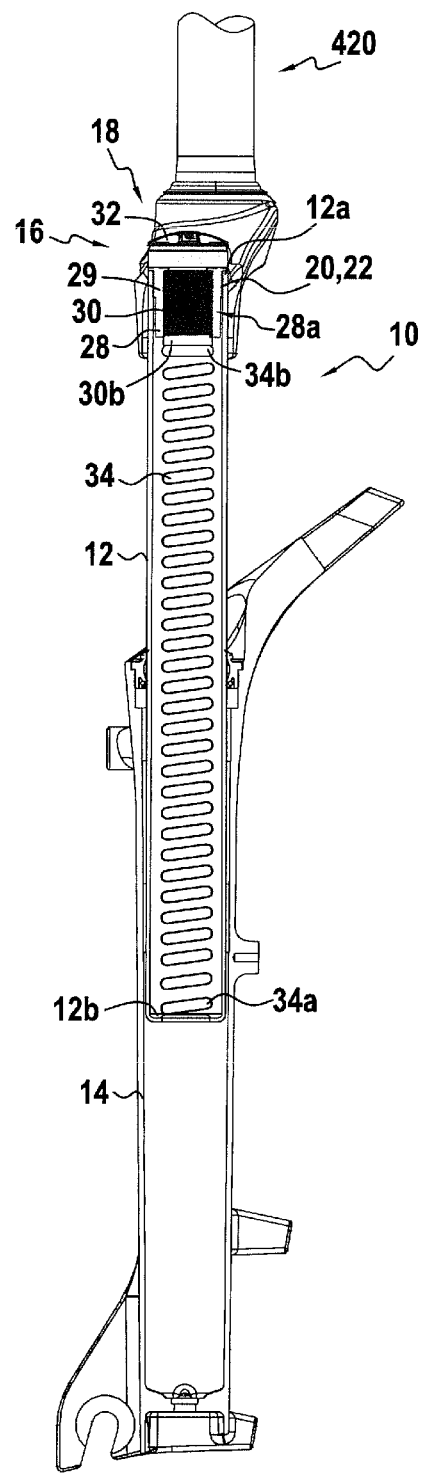
FIG. 3 is a sectional view of the suspension device according to the invention.

In FIG. 2 and FIG. 3, the arm 414 comprises a first tube 12 having a diameter less than the diameter of a second tube 14. Also, said first tube 12 is in part inserted into the second tube 14. Also, the first tube 12 is mounted sliding relative to the second tube 14 according to a longitudinal axis A of the first tube 12.

Also, a pretension stopper 18 is screwed at an upper end 16 of the first tube 12, by means of a first tapping 20 arranged at the upper end of an inner surface 12a of the first tube 12 and a thread 22 arranged on an outer surface 24 of a body 28 of the pretension stopper 18. The body 28 of the pretension stopper extends according to the longitudinal axis A. The body 28 of cylindrical form has an inner portion in a bore 29 extending according to the longitudinal axis A. The bore 29 comprises a second tapping 28a through which a plunger 30 is screwed comprising a second thread 30a on an outer wall.

The pretension stopper 18 also comprises an actuation button 32 mounted to rotate relative to the body 28 according to the longitudinal axis A of the first tube 12.

The suspension device 10 also comprises a main spring 34 arranged inside the first tube 12 and the second tube 14. A first end 34a of the main spring 34 is supported against the inner face 12b of the first tube 12. Also, a second end 34b of the main spring 34 is supported against a lower face 30b of the plunger 30.

Figure 4:
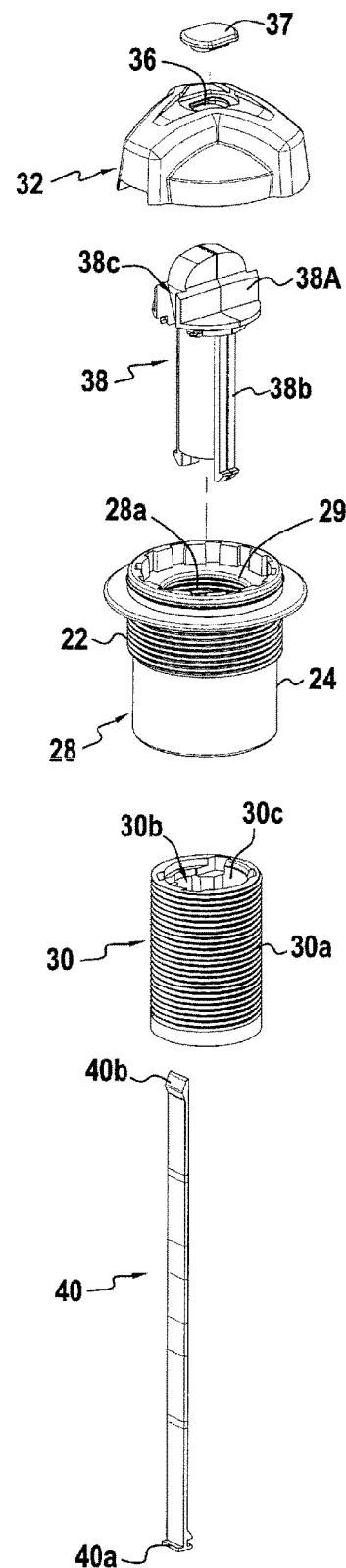
FIG. 4 is an exploded view of a first embodiment of the pretension adjustment stopper.

According to a first embodiment, in reference to FIGS. 4 to 6, the actuation button 32 is mounted to rotate relative to the body 28 according to the longitudinal axis A. It is also illustrated that the actuation button comprises a window 36 flush with the upper surface 32a of the actuation button 32. Also, the outer surface 24 of the body comprises the thread 22. In this example, the window 36 is protected by a transparent protection piece 37 at the same time protecting and allowing to read the available information.

Figure 6A:
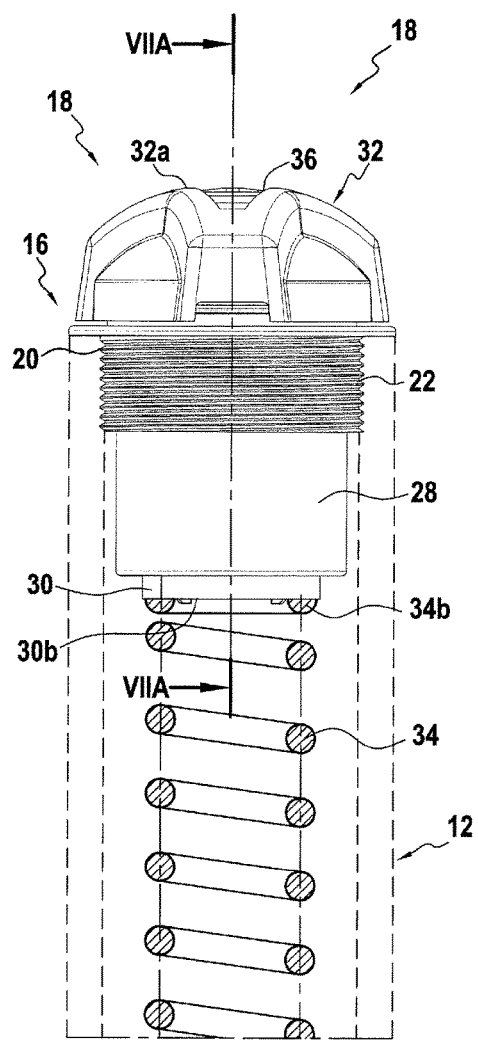
FIGS. 6A and 6B are sectional views of the first embodiment of the pretension adjustment stopper mounted on the suspension device in a first position and a second position.
Figure 6B:
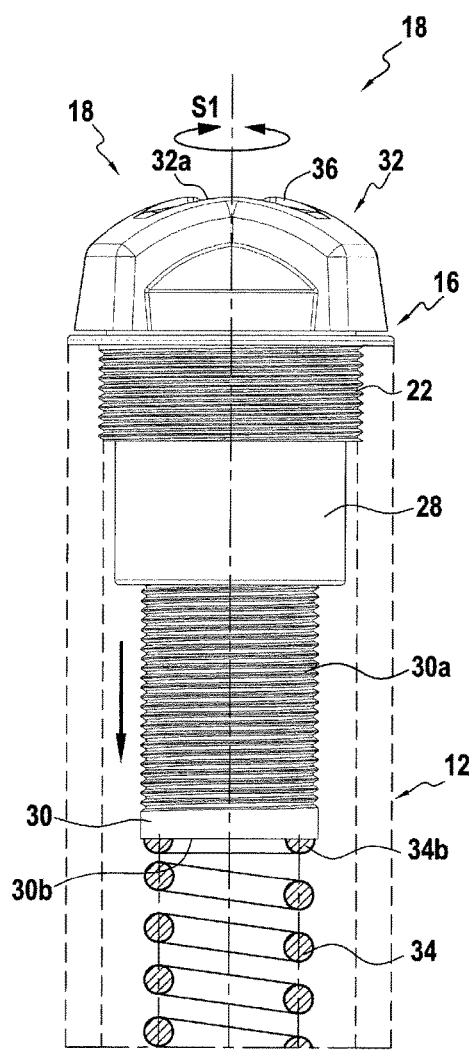

Also, FIGS. 6A and 6B show the pretension stopper 18 according to the first embodiment mounted at the upper end 16 of the first tube 12. The pretension stopper 18 comprises the plunger 30 which comprises the lower face 30b on which the first end 34b of the main spring 34 is supported. By way of the exploded view of FIG. 4, it is clear that the plunger 30 comprises an axial recess 30c in which is inserted an extension 38 connected to the actuation button 32. Also, the actuation button 32 comprises cooperation means with the wall 38a of the extension 38.

In keeping with the invention, the suspension device also comprises a pretension tracking system 39 of the main spring representative of the weight of the user. In this embodiment, the pretension tracking system 39 comprises a flexible band 40 fixed to the plunger 30. More precisely, a first end 40a of the flexible band 40 is fixed to the plunger 30. The flexible band 40 can be fixed by means such as adhesive means or means such as locating lugs or other means which can fulfil this function. Also, a second end 40b of the flexible band stays free.

The flexible band 40 is arranged in a passage 41 made between the plunger 30 and the extension 38 on the one hand and between the extension 38 and the actuation button 30 on the other hand. In this way, the flexible band 40 is arranged opposite the window 36.

Figure 7:
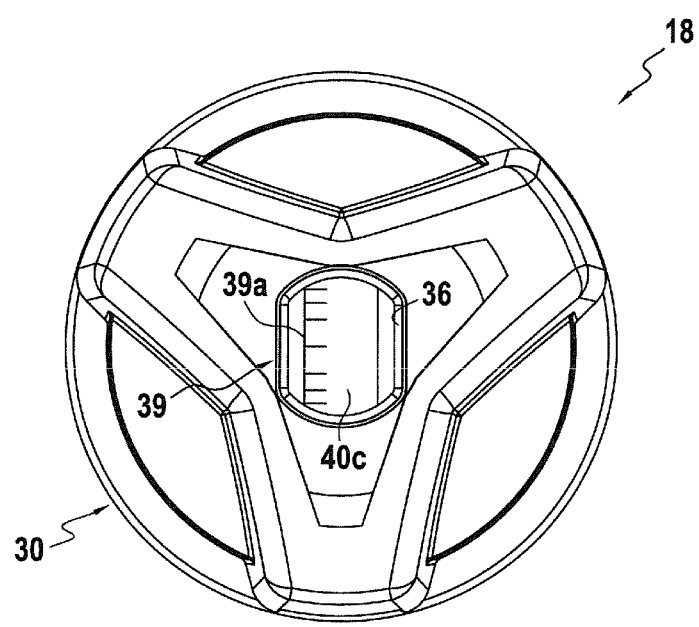
FIG. 7 is a plan view of the first embodiment of the pretension adjustment stopper.
Figures 8, 9:
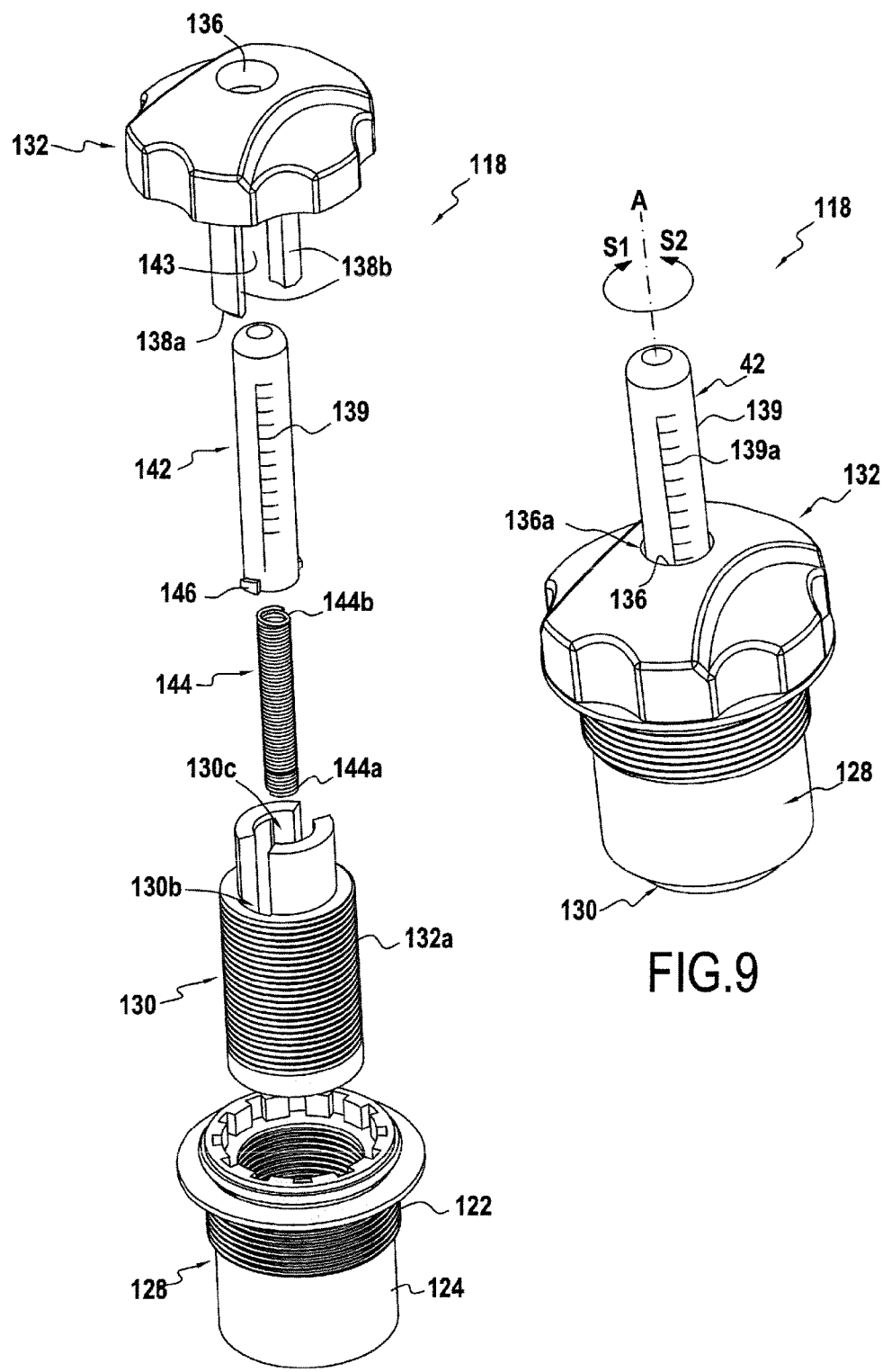
FIG. 8 is a sectional view of a second embodiment of the pretension adjustment stopper.
FIG. 9 is a view in perspective of a second embodiment of the pretension adjustment stopper.

In FIG. 7, in a plan view, the window 36 shows an upper face 40c of the flexible band 40 which has graduations 39a representing different weights of a user. Each graduation 39a can again represent an echelon of 5 kilos or any scale representative of weight.

In reference to FIGS. 6A and 6B, rotation of the actuation button 32 relative to the body 28 is carried out in a first direction S1 about the longitudinal axis A, the actuation button 32 drives the extension 38 in its rotation movement. Said extension 38 comprises second cooperation means 38b of rib type. The extension 38 drives the plunger 30 in rotation in the first direction S1. As the plunger 30 is screwed relative to the body 28 by means of the thread 30a, said plunger 30 transforms the rotation movement into translation movement. The plunger 30 descends inside the first tube 12. The main spring is compressed, such that pretension grows.

Also, in reference to FIG. 5B, it is clear that the plunger 30 drives the flexible band 40 in its movement. In this way, the flexible band scrolls past the window 36. Said graduations 39a made on the upper face 40c of the flexible band 40 scroll past the window 36 when the flexible band is set in motion by actuation of the stopper so as to indicate to the user to which weight the pretension of the main spring corresponds.

When there is rotation of the actuation button 32 relative to the body in the second direction S2 according to the longitudinal axis A, the actuation button 32 drives in its rotation movement the extension 38. As the ribs 38b cooperate with grooves 30b formed in the wall of the axial recess 30c of the plunger 30, the extension drives the plunger 30 in rotation in the second direction S2. As the plunger 30 is screwed into the body 28, said plunger 30 transforms the rotation movement into translation movement. In this way, the plunger is mounted inside the body towards the end which bears the stopper 18, such that pretension diminishes.

In this way, setting in rotation in the first direction S1 or the second direction S2 of the actuation button 32 ceases when the graduation 39a corresponding to the weight of the user is indicated in the window 36.

It is also illustrated that the second end 40b of the flexible band comprises a bead which stops against the wall 38c of the extension 38 when the plunger 30 and the flexible band 40 have reached the maximum of their travel.

In reference to FIGS. 8 to 11, a second embodiment will now be described.

In the same way in the first embodiment, the pretension stopper 118 comprises the actuation button 132 which is mounted to rotate relative to the body 128 according to the longitudinal axis A.

The plunger 130 comprises a thread on the outer surface 130a. The thread 130a of the plunger 130 cooperates with the tapping 128a made on the inner wall of the body.

Also, the plunger 130 comprises the axial recess 130c and also comprises the longitudinal grooves 130b into which the ribs 138b of the extension 138 are inserted. The extension 138 is fixed to the actuation button 132. The actuation button and the extension can be two separate pieces assembled or made in a single piece.

The actuation button 132 also comprises an orifice 136 made at the upper surface 132a which opens on a housing 43 formed in the extension 138, said housing 143 extending longitudinally according to the longitudinal axis A. The window 136 allows passage of a rod 142, forming part of the pretension tracking system, which extends longitudinally according to the longitudinal axis A in the housing 143. This rod 142 has a deployed position in which it projects out of the stopper 118 according to the longitudinal direction A, and a retracted position in which it is entirely housed inside the stopper 118. In this example, the rod 142 comprises on an outer face the pretension tracking system 139 comprising the scale of graduations 139a representative of the weight of a user. The rod 142 is hollow and receives a second spring 144 inside. The second spring which extends according to the longitudinal axis comprises a first end 144a supported against an inner wall 130d of the plunger 130 and also comprises a second end 144b supported against an inner face 142a of the rod 142. The rod 142 also comprises in its lower part 142b lugs 146 which cooperate with the lower surface of the extension when the rod 142 is in a locked position.

Figure 10:
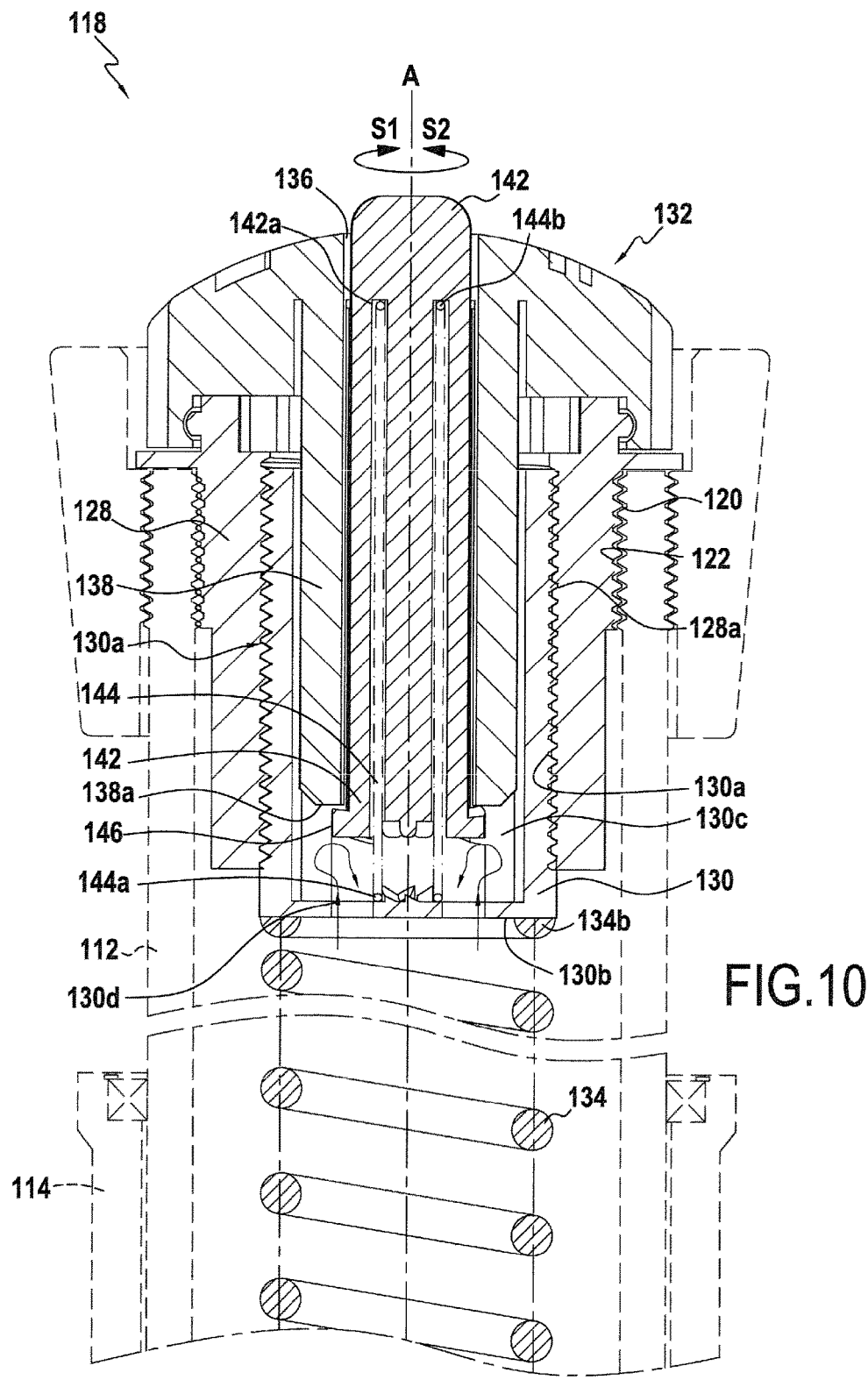
FIG. 10 is an exploded view of the second embodiment of the pretension adjustment stopper mounted on the suspension device in a first position.

In FIG. 10, the rod 142 is in a retracted position when the lugs 146 arranged in the lower part 142b of the rod 142 are held supported against the lower surface 138a of the extension 138 by means of a force parallel to the longitudinal axis A exerted by the second spring 144 on the rod 142.

Figure 11:
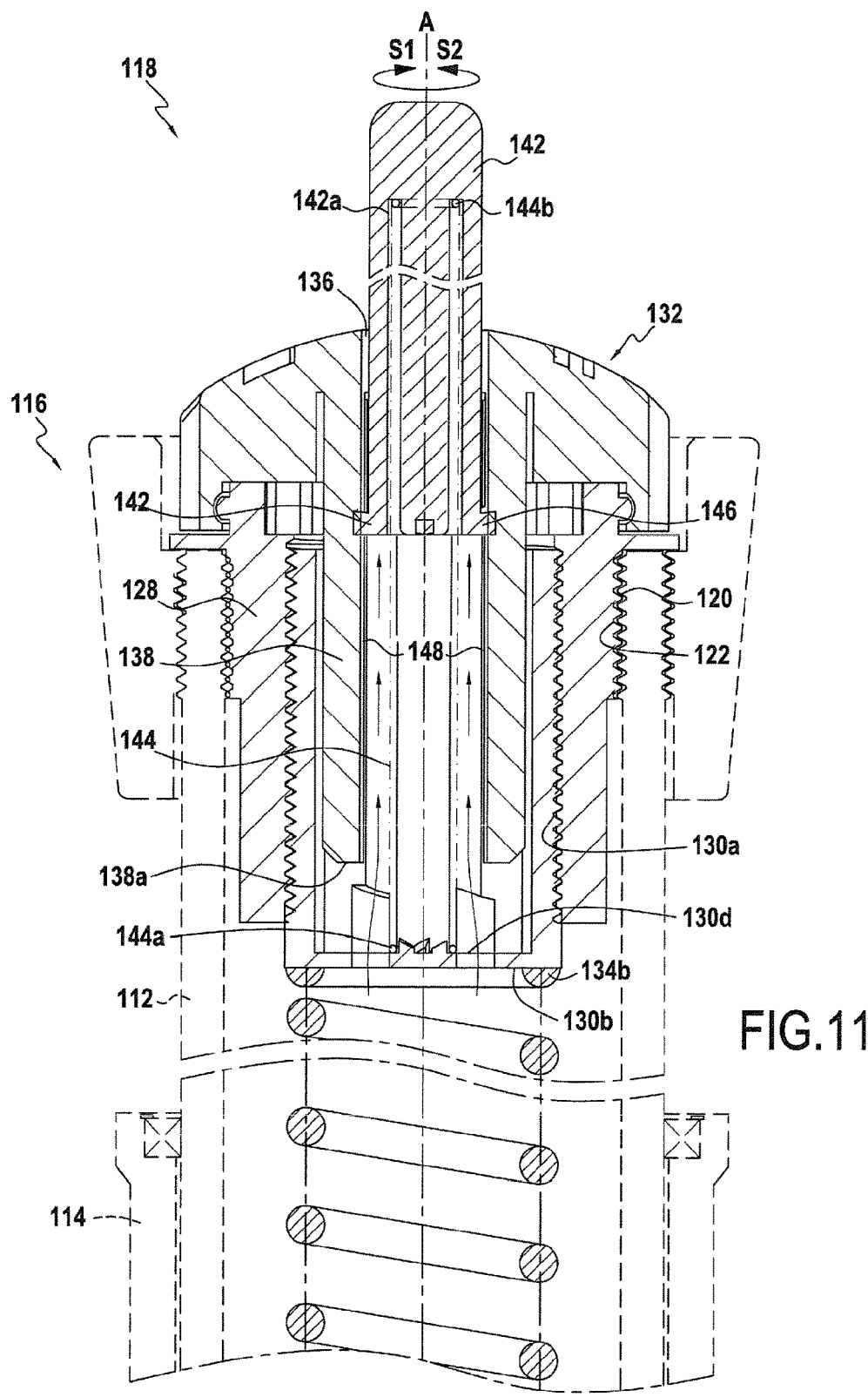
FIG. 11 is a sectional view of the second embodiment of the pretension adjustment stopper mounted on the suspension device in a second position.

In FIG. 11, the rod 142 is in a deployed position. To move from the retracted position to the deployed position, rotation of the rod 142 is described according to the first direction S1 or the second direction S2 such that the lugs 146 are aligned with guides 148 extending in the housing according to the longitudinal axis. The rod 142 undergoes displacement according to the longitudinal axis. In this way, the graduations 139a appear to perform adjustment of the suspension device 10.

Next, there is rotation of the actuation button 132 relative to the body 128 according to the first direction S1 or according to the second direction S2 about the longitudinal axis A. The actuation button 132 and the extension 138 which is connected thereto drive the plunger 130 in rotation which according to the first direction S1 or the second direction S2. Since the plunger 130 is mounted by a thread on the body 128, said plunger 130 transforms the rotation movement into translation movement according to the longitudinal axis A. The plunger 130 drives in its translation movement the second spring 144 which is supported against the lower surface 130d.

When the plunger 130 moves towards the lower end 112b of the first tube 112, the second spring 144 and the rod 142 also move towards the lower end 112b of the first tube 112. In the same way, the plunger 138 moves towards the upper end 16 of the first tube 112, the second spring 144 and the rod 142 also describe a movement towards the upper end 116 of the first tube 112. In this latter case the part of the rod 142 extracted from the pretension stopper 118 is bigger.

When the graduation 139a corresponding to the weight of the user is aligned with the edge 136a of the window 136, rotation of the actuation button 132 is stopped, then the rod 142 is returned to the retracted position.

Figure 12:
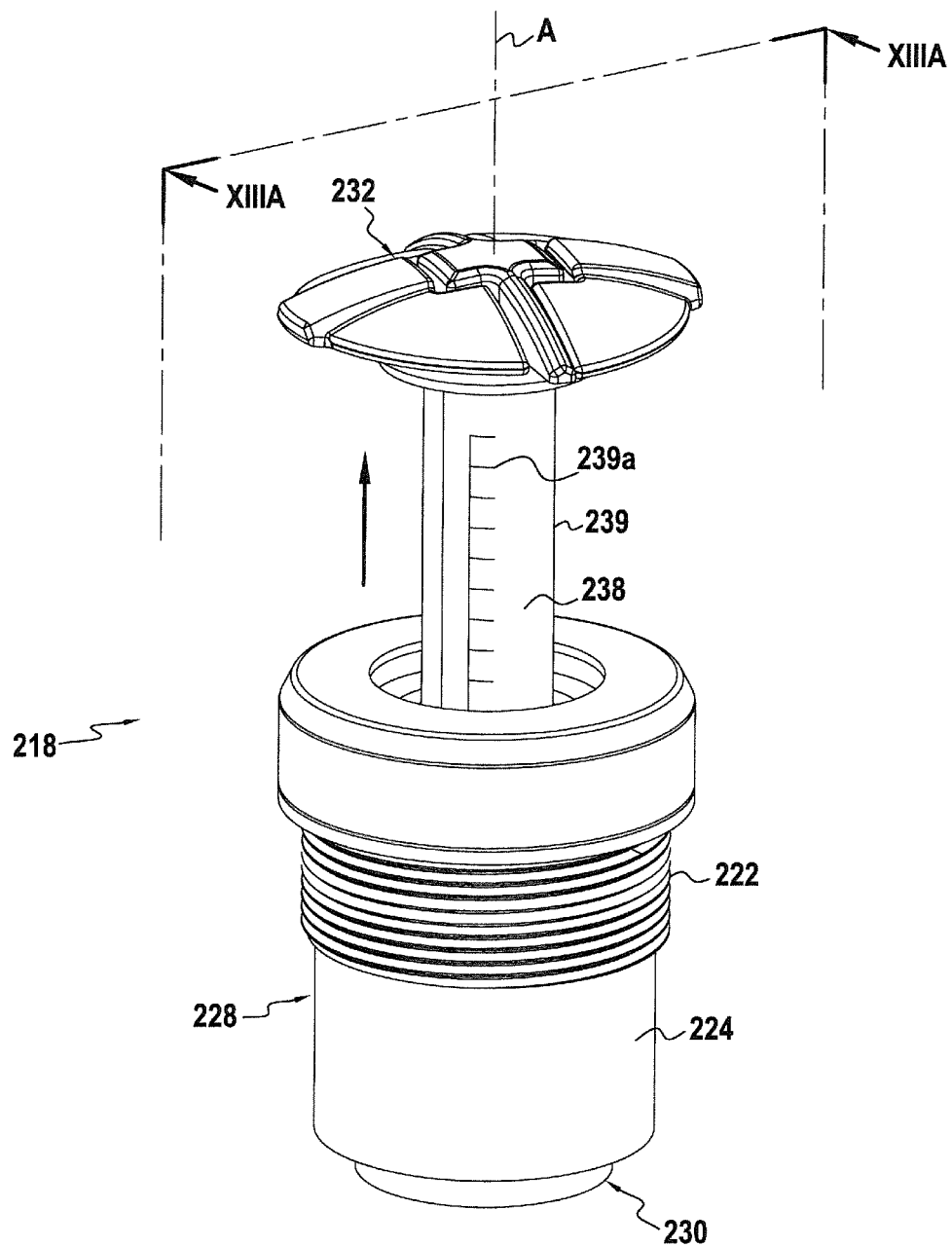
FIG. 12 is a view in perspective of a third embodiment of the pretension adjustment stopper.

In reference to FIGS. 12 to 14, a third embodiment of the invention will now be described.

In the same way as for the preceding embodiments, the pretension stopper 218 comprises an actuation button 232, a body 228, a plunger 230. The extension 238 comprises on the outer face the pretension tracking system 239 comprising the graduation scale 239a representative of the weight of the user.

Also, the extension 238 is fixed to the lower part of the actuation button 230. The extension 238 comprises in its lower part 238c blockage elements constituted by lugs 248 which cooperate with cavities 259 arranged in the upper part of the axial recess 230c of the plunger 230.

To complete adjustment of the suspension device 10, the extension 238 connected to the actuation button 232 is partially extracted from the axial recess 230c. The extension 238 is slid into the plunger 230 by means of ribs 238b cooperating with the grooves 230b of the plunger until the lugs 248 are blocked in the cavities 259.

Also, the actuation button 232 comprises fins mounted in rotation according to an axis perpendicular B to the longitudinal axis A. In this way the fins 260 present a lower surface plane 260a which matches the form of the stopper 218. When the fins 260 have completed rotation of 90° about the axes B, the flat surfaces 260a have the advantage of forming a prehension surface of the actuation button for easier rotation of the actuation button 232.

Figure 14A:
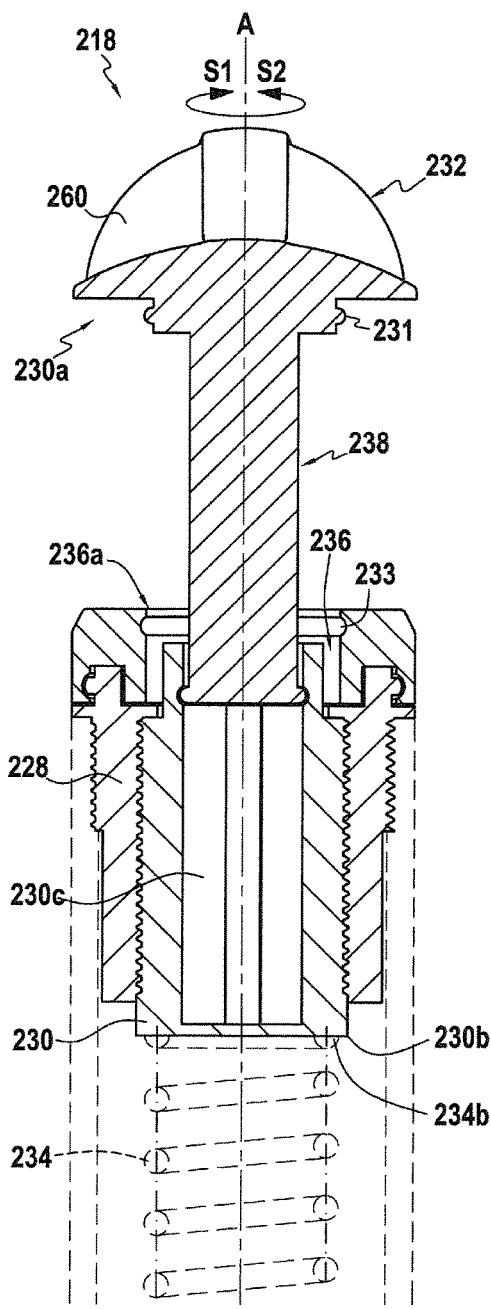
FIGS. 14A and 14B are sectional views of the third embodiment of the pretension adjustment stopper mounted on the suspension device where the plunger is in a second position.
Figure 14B:
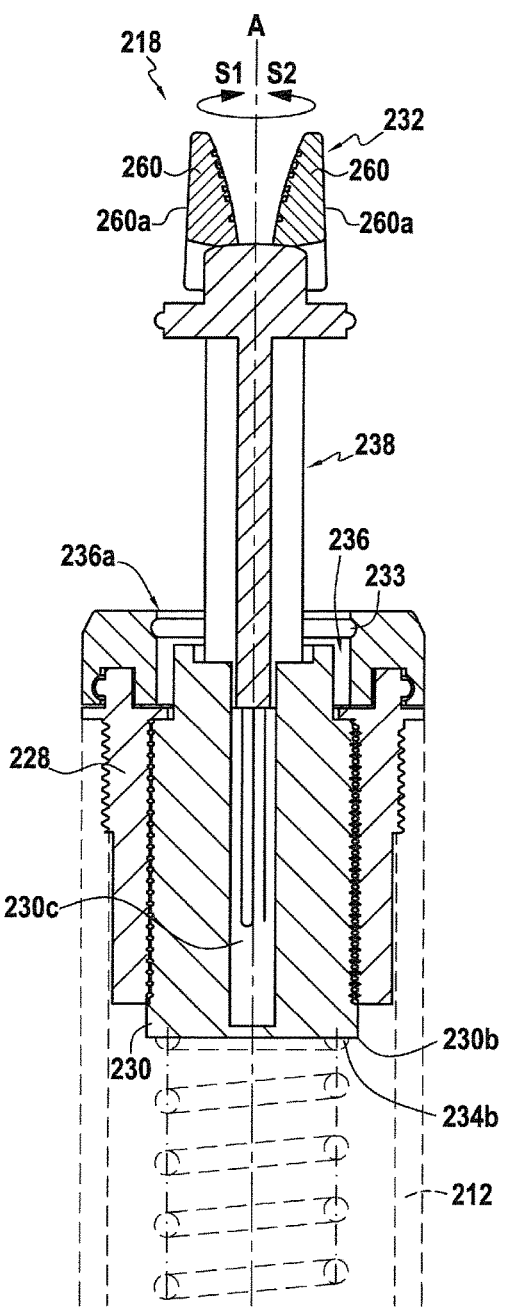
Figure 15A:
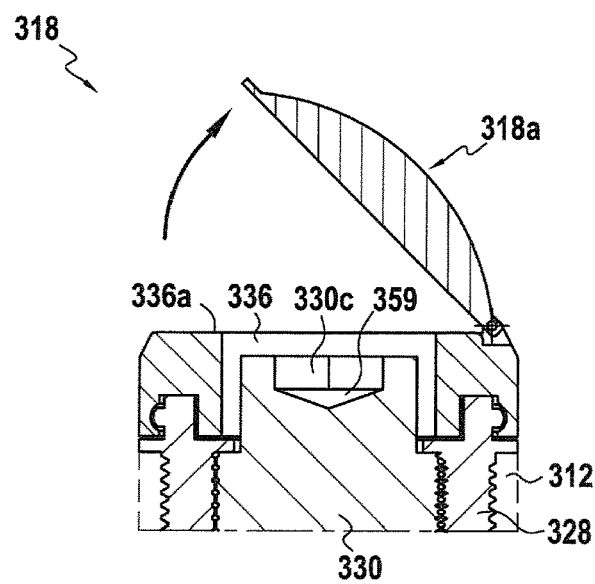
FIGS. 15A and 15B is sectional view of the fourth embodiment of the pretension adjustment stopper.
Figure 15B:
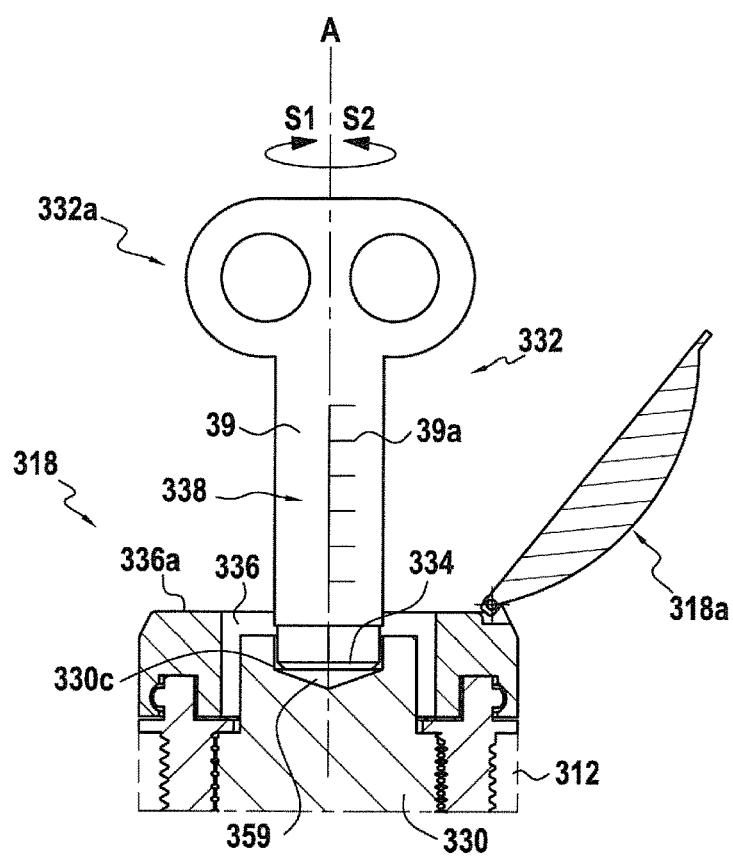

In reference to FIGS. 14A and 14B, when there is rotation of the actuation button 232 according to the first direction S1 or according to the second direction S2, the fins 260 are positioned in planes parallel to the longitudinal axis A, and the lugs 248 cooperate with the cavities 259. The rotation of the actuation button directly drives the plunger 232 in rotation according to the longitudinal axis A. When the graduation 239a corresponding to the weight of the user is aligned with the edge 236a of the window 236, rotation of the actuation button 232 is discontinued.

According to FIGS. 13A and 13B, in the retracted position, the extension 38 connected to the actuation button is fully introduced to the axial recess 232c of the plunger. It is also illustrated that the actuation button comprises in its upper part 232a position-locking means comprising a ring 231 inserted into in a complementary form 233 arranged in the upper part of the stopper 218.

According to a fourth embodiment, the stopper 318 comprises the body 328 mounted screwed on the first tube 312, the actuation button 332 and the plunger 330 screwed inside the body 328. The actuation button 332 takes the form of a removable key 332. The stopper 318 comprises a window 336.

The key 332 comprises prehension lugs 332a. The key 332 also comprises the extension 338 comprising the pretension tracking system. The key 332 also comprises in its lower part cooperation means 334 which are configured to cooperate with the cavity 359 located on the inner surface of the axial recess 330c of the plunger such that the key 332 can be connected to the plunger 330.

For adjustment of the suspension device 10, the key 332 is inserted into the axial recess 330c of the plunger until the cooperation means 334 are blocked in the cavity 359.

With rotation of the key 332 according to the first direction S1 or according to the second direction S2, the key directly drives the plunger 330 in rotation about the longitudinal axis A, also causing the rise or the descent of the plunger and, consequently, a decrease or increase in pretension. When the graduation 339a corresponding to the weight of the user is aligned with the edge 336a of the window 336, rotation of the key 332 is discontinued.

Also, the stopper 318 comprises a cover 318a mounted pivoting so as to conceal the axial recess 330c formed inside the plunger 330 when the key 332 is withdrawn from the axial recess 330c.

The invention claimed is:

1. A telescopic suspension device configured to be attached to the hub of a wheel comprising a first tube, a second tube configured to slide relative to the first tube and a main spring arranged inside said first and second tubes, and further comprising a pretension adjustment stopper of the main spring installed at an upper end of said first tube, wherein the pretension adjustment stopper of the main spring comprises a pretension tracking system of the main spring located within said pretension adjustment stopper and configured to convey information representative of the weight of the user.

2. A bicycle frame comprising at least one suspension device as claimed in claim 1.

3. A telescopic suspension device configured to be attached to the hub of a wheel comprising a first tube, a second tube configured to slide relative to the first tube and a main spring arranged inside said first and second tubes, and further comprising a pretension adjustment stopper of the main spring installed at an upper end of said first tube, wherein the pretension adjustment stopper of the main spring comprises a pretension tracking system of the main spring configured to convey information representative of the weight of the user, wherein said pretension adjustment stopper comprises a body fixed to the upper end of the first tube, wherein said body houses a plunger threaded externally and screwed into a tapped inner portion of the body, wherein said plunger is supported against one end of the main spring, and wherein an actuation button is rotatably mounted at an end of the body and rotatably coupled to said plunger by a sliding arrangement having a longitudinal groove and a longitudinal rib.

4. The telescopic suspension device according to claim 3, wherein said plunger comprises an axial recess with which an extension of the actuation button engages, and wherein said sliding arrangement is defined between said extension and the inner surface of said axial recess.

5. The telescopic suspension device according to claim 4, wherein the actuation button comprises an external prehension part fitted with a window, wherein said actuation button is fixed to said extension, wherein a passage is defined between the plunger and the extension, and between the extension and the button, the passage passing opposite the window, wherein the pretension tracking system comprises a flexible band housed in the passage, the flexible band bearing graduations representative of the weight of a user, and wherein the flexible band is fixed to a point of the plunger opposite the window, such that actuation of the actuation button scrolls the graduations in front of the window and modifies a pretension of the main spring.

6. The telescopic suspension device according to claim 4, wherein the pretension tracking system is supported by the extension, wherein the actuation button is mobile longitudinally relative to the plunger between two cavities spaced longitudinally, and wherein the tracking system is supported by the button.

7. The telescopic suspension device according to claim 6, wherein the actuation button comprises articulated fins each joining a part of the upper surface of the stopper.

8. The telescopic suspension device according to claim 4, wherein the pretension tracking system of the main spring is supported by a rod inserted into a housing formed in the extension, and wherein a ratchet mechanism connected to the rod is arranged at a lower end of the extension.

9. The telescopic suspension device according to claim 4, wherein the button has a form of a key bearing the pretension tracking system which engages in the upper part of the stopper, the key cooperating with the plunger.

* * * * *